United States Patent [19]
Shoji et al.

[11] Patent Number: 5,349,868
[45] Date of Patent: * Sep. 27, 1994

[54] PRESSURE SENSOR INCLUDING BRIDGE CIRCUIT FOR DETECTING PERMEABILITY OF A MAGNETIC LAYER

[75] Inventors: Rihito Shoji, Yawata; Hiroyuki Hase, Kyoto; Masayuki Wakamiya, Suita, all of Japan

[73] Assignee: Matsushita Electric Industries Co., Ltd., Osaka, Japan

[ * ] Notice: The portion of the term of this patent subsequent to Nov. 24, 2009 has been disclaimed.

[21] Appl. No.: 51,302

[22] Filed: Apr. 23, 1993

[30] Foreign Application Priority Data

Apr. 23, 1992 [JP] Japan .................................. 4-103296

[51] Int. Cl.$^5$ .............................................. G01L 9/10
[52] U.S. Cl. ............................................ 73/728; 336/30
[58] Field of Search ................. 73/728, 722, DIG. 2, 73/708; 336/30; 148/121

[56] References Cited

U.S. PATENT DOCUMENTS

| | | | |
|---|---|---|---|
| 4,170,498 | 10/1979 | Jost et al. | 148/121 |
| 4,696,192 | 9/1987 | Yamashit et al. | 73/728 |
| 4,936,069 | 6/1990 | Hunter et al. | 52/309.4 |
| 4,938,069 | 7/1990 | Shoji et al. | 73/728 |
| 5,165,284 | 11/1992 | Shoji et al. | 73/728 |

FOREIGN PATENT DOCUMENTS 0371244  6/1990  European Pat. Off. .
2418453  9/1979  France .

Primary Examiner—Richard E. Chilcot, Jr.
Assistant Examiner—William L. Oen
Attorney, Agent, or Firm—Wenderoth, Lind & Ponack

[57] ABSTRACT

In a bridge circuit of a pressure sensor, resistances are connected in series to the impedances of a pressure detection coil and of a dummy coil for differential provided for deforming and non-deforming parts, and the values of the resistances are smaller than the impedances of the coils. The inductance and the internal resistance of the coils are measured under zero pressure and under the highest rating pressure. The resistance connected to the pressure detector coil is determined so that the sensor output sensitivity, represented as a difference of the sensor outputs under zero pressure and under the highest rating pressure, at the highest temperature agrees with that at the lowest temperature. The resistance connected to the dummy coil is determined so that the sensor output, represented as a difference of the sensor outputs under zero pressure, at the highest temperature agrees with that at the lowest temperature.

22 Claims, 6 Drawing Sheets

PRESSURE SENSOR INCLUDING BRIDGE CIRCUIT FOR DETECTING PERMEABILITY OF A MAGNETIC LAYER

BACKGROUND OF THE INVENTION

1. Field of the Invention

The present invention relates to a pressure sensor.

2. Description of the Prior Art

Recently, a pressure sensor employing the magnetostriction effect of an amorphous magnetic alloy has been proposed (for example U.S. Pat. No. 4,938,069). In such a pressure sensor, a magnetic material having a large magnetostriction effect is fixed on a deforming part subjected to an external pressure to be detected. The permeability of the magnetic material is changed by an applied pressure, and a coil detects a permeability change caused by the applied pressure. A change of pressure is derived from a differential of the output of the coil from that of a dummy coil. In a bridge circuit including the two coils, the two coils are connected to resistances of the same impedance values of the coils, respectively. A problem of the pressure sensor of this type is that the precision of the pressure substantially worsens if the temperature departs from a standard temperature.

SUMMARY OF THE INVENTION

An object of the present invention is to provide a pressure sensor having good temperature characteristics.

In one aspect of the invention, a sensor body of a pressure sensor has a deforming part deformable under an applied pressure to be detected and a non-deforming part subjected to a constant pressure. The deforming part has an opening for introducing the applied pressure. A magnetic layer made of a material having large magnetostriction is fixed on the deforming part and on the non-deforming part. First and second permeability detector elements are disposed to detect the permeability of the magnetic layer on the deforming part and on the non-deforming part, respectively, and each of the first and second permeability detector elements having an inductance and an internal resistance. A bridge is constructed by the first and second permeability detector elements and first and second resistors for taking out a difference of the voltages generated in the first and second permeability detector elements. The first resistor connected to the first permeability detector element has a resistance smaller than the impedance of the first permeability detector element, and the second resistor connected to the second permeability detector element has a resistance smaller than the impedance of the second permeability detector element; wherein a bridge is constructed by the first and second permeability detector elements and the first and second resistors.

Further, an optimum value of the resistance of the first or second resistor is determined with use of Eqs. (2)–(4) explained below. The temperature characteristic of the sensor output can be improved or the deterioration of the sensor precision due to temperature can be suppressed. The value of R can be determined with Eq. (2) and the change of output width due to temperature can be decreased. The value of $R_d$ can be determined with Eq. (3) or (4), and the zero point drift can be decreased. Thus, the output precision of the pressure sensor is improved remarkably by using the resistances R, $R_d$.

An advantage of the present invention is that the temperature characteristic of the pressure sensor relative to the precision of detected pressure value is substantially improved.

Another advantage of the present invention is the zero point drift due to temperature of the pressure sensor is also substantially improved.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
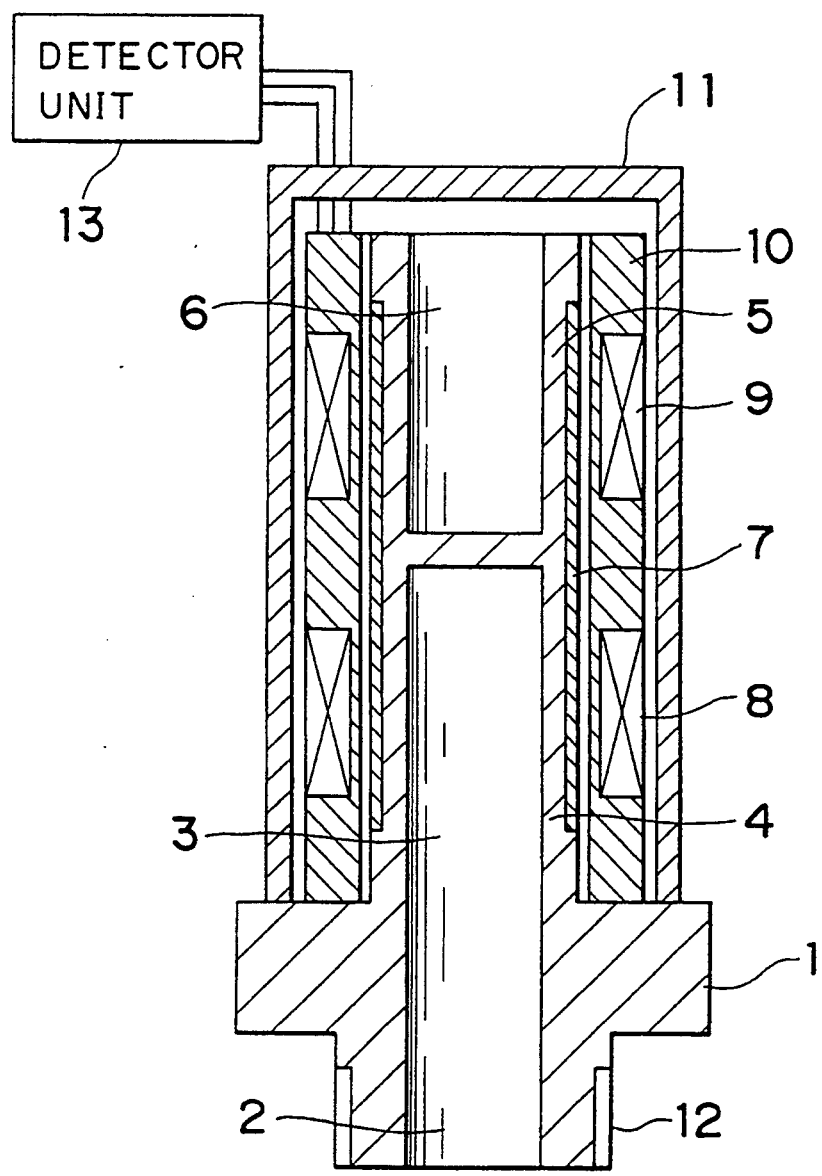
FIG. 1 is a schematic sectional view of a pressure sensor.

Referring now to the drawings, wherein like reference characters designate like or corresponding parts throughout the several views, FIG. 1 shows a sectional view of a pressure sensor, wherein reference numeral 1 denotes a cylindrical columnar body made of titanium of 10 mm diameter and of 70 mm height, reference numeral 2 denotes an opening of 6 mm diameter for introducing a pressure, reference numeral 3 denotes a pressure chamber for providing a pressure to be measured, and reference numeral 4 denotes a deforming part of the columnar cylindrical body 1 which deforms according to the pressure in the pressure chamber 3, and it has 2 mm thickness. Reference numeral 5 denotes a non-deforming part of the columnar cylindrical body 1 and reference numeral 6 denotes a hollow portion provided inside the non-deforming part 5 of the same volume as the pressure chamber 3. The non-deforming part 5 is not deformed by pressure because it is subjected to a constant pressure in the hollow part 6. Reference numeral 7 denotes a magnetic layer having large magnetostriction effect. In the present embodiment, the magnetic layer 6 is made of 0.03 mm thickness of an amorphous Fe-Si-B-Cr alloy, and it is adhered to the columnar cylindrical body 1 outside the deforming and non-deforming parts 4, 5 with an imide adhesive agent at 250° C. for one hour. Reference numeral 12 denotes a screw thread of PF ⅜ of pitch for connecting the columnar cylindrical body 1 to an external pressure source which supplies a pressure to be detected by the pressure sensor.

Figure 2:
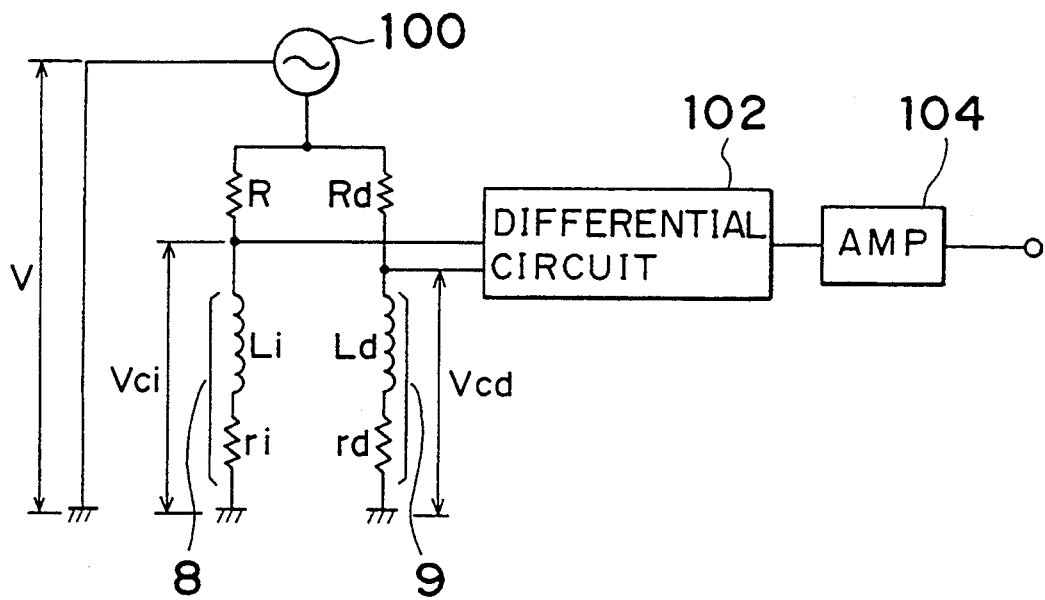
FIG. 2 is a diagram of a first detection circuit.
Figure 3:
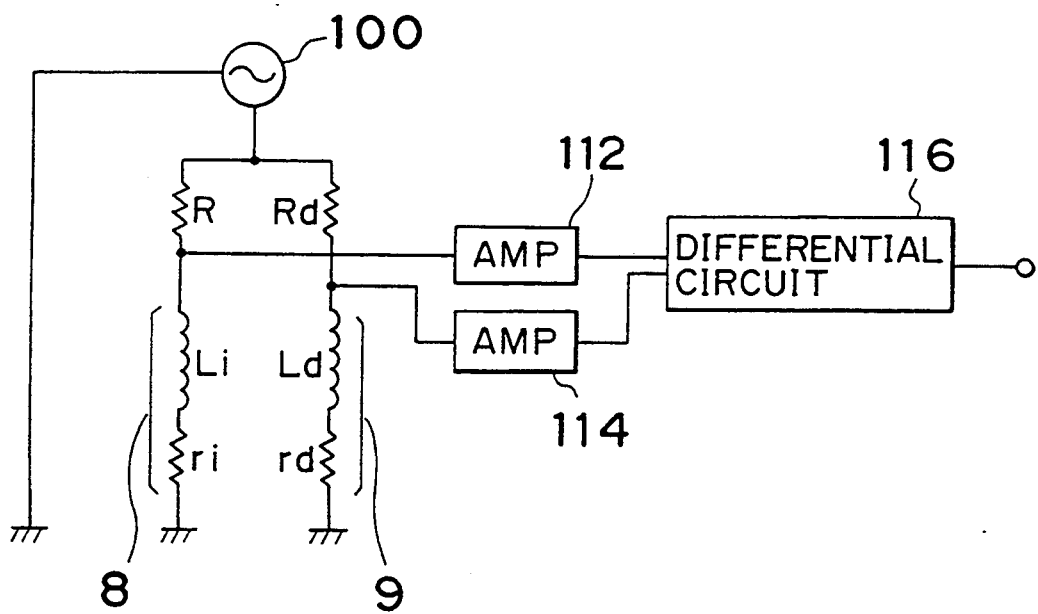
FIG. 3 is a diagram of a second detection circuit.

Reference numeral 8 denotes a pressure detector coil of 100 turns for detecting the permeability, while reference numeral 9 denotes a dummy coil of the same structure as the pressure detector coil 8 provided to give a reference value when a differential of the outputs of the two coils 8, 9 is obtained. Reference numeral 10 denotes a bobbin made of phenol resin arranged outside the columnar cylindrical body 1, and the coils 8, 9 are provided on the outer surface of the bobbin 10 surrounding the magnetic layer 7 on the deforming and non-deforming parts 4, 5. Reference numeral 11 denotes a yolk made of 48% Ni-Fe alloy, and it is provided outside the bobbin 10 and fixed to the columnar cylindrical body 1. Reference numeral 13 denotes a detector unit as shown in FIG. 2 or 3. As shown in FIG. 1, the magnetic circuit made by the magnetic layer 7 and the coils 8, 9 are symmetrical between the deforming and non-deforming parts 4, 5. The detector unit 13 is preferably integrated with the pressure sensor to from an integrated pressure sensor.

The external pressure is introduced from the opening 2 to the pressure chamber 3 and the pressure chamber 3 is expanded by the pressure. Then, the deforming part 4 is deformed to change the permeability of the magnetic alloy 7 adhered to the surface of the deforming part 4. By supplying a high frequency electric current to the pressure detector coil as explained below, a change of the permeability is detected by the pressure detector coil 8 as a change of the inductance, and the pressure is obtained from a differential of the output of the pressure detector coil 8 with that of the dummy coil 9.

FIGS. 2 and 3 show diagrams of detection circuits including the two coils 8, 9 and the detector unit 13, wherein $L_i$ and $r_i$ denote the inductance component and the internal resistance component of the pressure detector coil 8 while $L_d$ and $r_d$ denote the inductance component and the internal resistance component of the dummy coil 9. Further, R and $R_d$ denote resistances of resistors connected in series to the pressure detector coil 8 and to the dummy coil 9. As shown in FIGS. 2 and 3, a bridge is constructed from the pressure detector coil 8 ($L_i$, $r_i$), the dummy coil 9 ($L_d$, $r_d$), R, $R_d$, and an alternating voltage V is supplied to the bridge by an AC power source 100. In FIG. 2, a differential of terminal voltages $V_{ci}$ and $V_{cd}$ of the coils 8, 9 are obtained first by a differential circuit 102, and the differential is amplified next by the amplifier 104 to output a detection signal. In FIG. 3, the terminal voltages $V_{ci}$ and $V_{cd}$ of the coils 8, 9 are amplified first by the amplifiers 112 and 114, and a differential of the outputs of the amplifiers 112 and 114 is obtained by a differential circuit 116.

In order to improve the temperature characteristic of the sensor output, the inventors pay their attention to the detector circuit. The values of R and $R_d$ in the detector circuit are found to affect the temperature characteristic of the pressure sensor output largely. A theoretical analysis of the temperature characteristic of the sensor output shows that the temperature change of the output sensitivity depends on R and that the temperature change of the zero point output depends on $R_d$.

Eq. (1) shows the output sensitivity.

$$\left|\frac{\Delta V}{V}\right| = \left|\left|\frac{V_{ca}}{V}\right| - \left|\frac{V_{ci}}{V}\right|\right| \qquad (1)$$

$$= \left|\frac{\sqrt{[r_d(R + r_d) + W^2 L_d^2]^2 + W^2 L_d^2 R^2}}{(R + r_d)^2 + W^2 L_d^2} - \frac{\sqrt{[r_i(R + r_i) + W^2 L_i^2]^2 + W^2 L_i^2 R^2}}{(R + r_i)^2 + W^2 L_i^2}\right|,$$

wherein

"V" denotes an AC voltage applied to the bridge,
"$V_c$" denotes a terminal voltage of the coil,
"r" denotes an internal resistance of the coil,
"L" denotes an inductance of the coil,
"R" denotes the resistance connected to the coil for the deforming part, and
"f" denotes the frequency of the applied voltage ($\omega = 2\pi f$).

It is clear from Eq. (1) that if R is increased extremely, $|\Delta V/V|$ or the sensor output sensitivity against the applied voltage V tends to zero though Eq. (1) holds and the output sensitivity suitable for a sensor cannot be obtained. Thus, the value of R is determined in a range less than the impedance (342Ω) of the pressure detector coil 8.

Further, in this invention, the changes of the output sensitivity and of the zero point output are obtained at a plurality of temperatures preferably including the highest and lowest temperatures of the operating temperature range of the pressure sensor. Then, the values of R and $R_d$ are determined so that the output sensitivity and the zero point output are kept constant over the measured temperatures simultaneously. By using the determined values of R and $R_d$, the output of the sensor does not depend on temperature. Details will be explained below.

In order to solve the equations of the bridge circuit simultaneously, an optimum R has to satisfy the following Eq. (2):

$$\left|\frac{\Delta V}{V}\right|_h = \left|\frac{\Delta V}{V}\right|_l, \qquad (2)$$

wherein $$\left|\frac{\Delta V}{V}\right|_h = \left|\left|\frac{V_{ca}}{V}\right| - \left|\frac{V_{ci}}{V}\right|\right|_h$$

$$= \left|\frac{\sqrt{[r_d(R + r_d) + W^2 L_d^2]^2 + W^2 L_d^2 R^2}}{(R + r_d)^2 + W^2 L_d^2} - \frac{\sqrt{[r_i(R + r_i) + W^2 L_i^2]^2 + W^2 L_i^2 R^2}}{(R + r_i)^2 + W^2 L_i^2}\right|_h,$$

and $$\left|\frac{\Delta V}{V}\right|_l = \left|\left|\frac{V_{ca}}{V}\right| - \left|\frac{V_{ci}}{V}\right|\right|_l$$

$$= \left|\frac{\sqrt{[r_d(R + r_d) + W^2 L_d^2]^2 + W^2 L_d^2 R^2}}{(R + r_d)^2 + W^2 L_d^2} - \frac{\sqrt{[r_i(R + r_i) + W^2 L_i^2]^2 + W^2 L_i^2 R^2}}{(R + r_i)^2 + W^2 L_i^2}\right|_l,$$

wherein
"V" denotes an AC voltage applied to the bridge,
"$V_c$" denotes a terminal voltage of the coil 8, 9,
"r" denotes an internal resistance of the coil 8,
"L" denotes an inductance of the coil 8, 9,
"R" denotes the resistance connected to the coil 8 for the deforming part 4, and
"f" denotes the frequency of the applied voltage ($\omega = 2\pi f$);

further, subscript "h" denotes a value at the highest temperature, subscript "l" denotes a value at the lowest temperature, subscript "a" denotes a value under the highest stress to be applied, and subscript "i" denotes a value under zero pressure.

Further, an optimum "$R_d$" satisfies Eq. (3) or (4):

$$\left|\frac{\Delta V}{V}\right|_h = \left|\frac{\Delta V}{V}\right|_l \quad (3)$$

wherein $$\left|\frac{\Delta V}{V}\right|_h = \left|\left|\frac{V_{ci}}{V}\right| - \left|\frac{V_{cd}}{V}\right|\right|_h$$

$$= \left|\frac{\sqrt{[r_i(R+r_i) + W^2L_i^2]^2 + W^2L_i^2R^2}}{(R+r_i)^2 + W^2L_i^2}\right.$$

$$\left. - \frac{\sqrt{[r_d(R_d+r_d) + W^2L_d^2]^2 + W^2L_d^2R_d^2}}{(R_d+r_d)^2 + W^2L_d^2}\right|_h$$

and $$\left|\frac{\Delta V}{V}\right|_l = \left|\left|\frac{V_{ci}}{V}\right| - \left|\frac{V_{cd}}{V}\right|\right|_l$$

$$= \left|\frac{\sqrt{[r_i(R+r_i) + W^2L_i^2]^2 + W^2L_i^2R^2}}{(R+r_i)^2 + W^2L_i^2}\right.$$

$$\left. - \frac{\sqrt{[r_d(R_d+r_d) + W^2L_d^2]^2 + W^2L_d^2R_d^2}}{(R_d+r_d)^2 + W^2L_d^2}\right|_h$$

or $$\left|\frac{\Delta V}{V}\right|_h = 0, \quad (4)$$

wherein $$\left|\frac{\Delta V}{V}\right|_h = \left|\left|\frac{V_{ci}}{V}\right|_h - \left|\frac{V_{cd}}{V}\right|_h \times \left|\frac{V_{ci}}{V_{cd}}\right|_l\right|$$

$$= \left|\left(\frac{\sqrt{[r_i(R+r_i) + W^2L_i^2]^2 + W^2L_i^2R^2}}{(R+r_i)^2 + W^2L_{ih}^2}\right)_h\right.$$

$$- \left(\frac{\sqrt{([r_d(R_d+r_d) + W^2L_d^2]^2 + W^2L_d^2R_d^2}}{(R_d+r_d)^2 + W^2L_d^2}\right)_h \times$$

$$\left\{\frac{\frac{\sqrt{[r_i(R+r_i) + W^2L_i^2]^2 + W^2L_i^2R^2}}{(R+r_i)^2 + W^2L_i^2}}{\frac{\sqrt{[r_d(R_d+r_d) + W^2L_d^2]^2 + W^2L_d^2R_d^2}}{(R_d+r_d)^2 + W^2L_d^2}}\right\}_l\right|$$

wherein

"V" denotes an AC voltage applied to the bridge,

"$V_c$" denotes a terminal voltage of the coil 8, 9,

"r" denotes an internal resistance of the coil 8, 9,

"L" denotes an inductance of the coil 8, 9,

"R" denotes the resistance connected to the coil 8 for the deforming part 4,

"$R_d$" denotes the resistance connected to the permeability detector element for the non-deforming part, and "f" denotes the frequency of the applied voltage ($\omega = 2\pi f$);

further, subscript "h" denotes a value at the highest temperature, subscript "l" denotes a value at the lowest temperature, subscript "a" denotes a value under the highest stress to be applied, subscript "i" denotes a value under zero pressure, and subscript "d" denotes a value for the non-deforming part 5.

The optimum, $R_d$ determined with use of Eqs. (2)–(4) are used in the detector unit 13. Then, the temperature characteristic of the sensor output can be improved or the decrease in the sensor precision due to temperature can be suppressed. That is, by using the value of R determined with Eq. (2), the change of output width due to temperature can be decreased. By using the value of $R_d$ determined with Eq. (3) or (4), the zero point drift can be decreased. Thus, the output precision of the pressure sensor is improved remarkably.

The values of the resistances R and $R_d$ are determines as follows:

(a) The inductance $L_i$, $L_d$ and the internal resistance $r_i$, $r_d$ of each coil 8, 9 are measured under zero pressure and under the maximum pressure (200 atm) both at the highest temperature (100° C.) and at the lowest temperature (−30° C.). The frequency of the applied voltage V is 32.8 Khz.

(b) The value of R is obtained by substituting the measured values $L_i$, Ld, $r_i$ and $r_d$ at the highest and lowest temperatures in Eq. (2).

Figure 4:
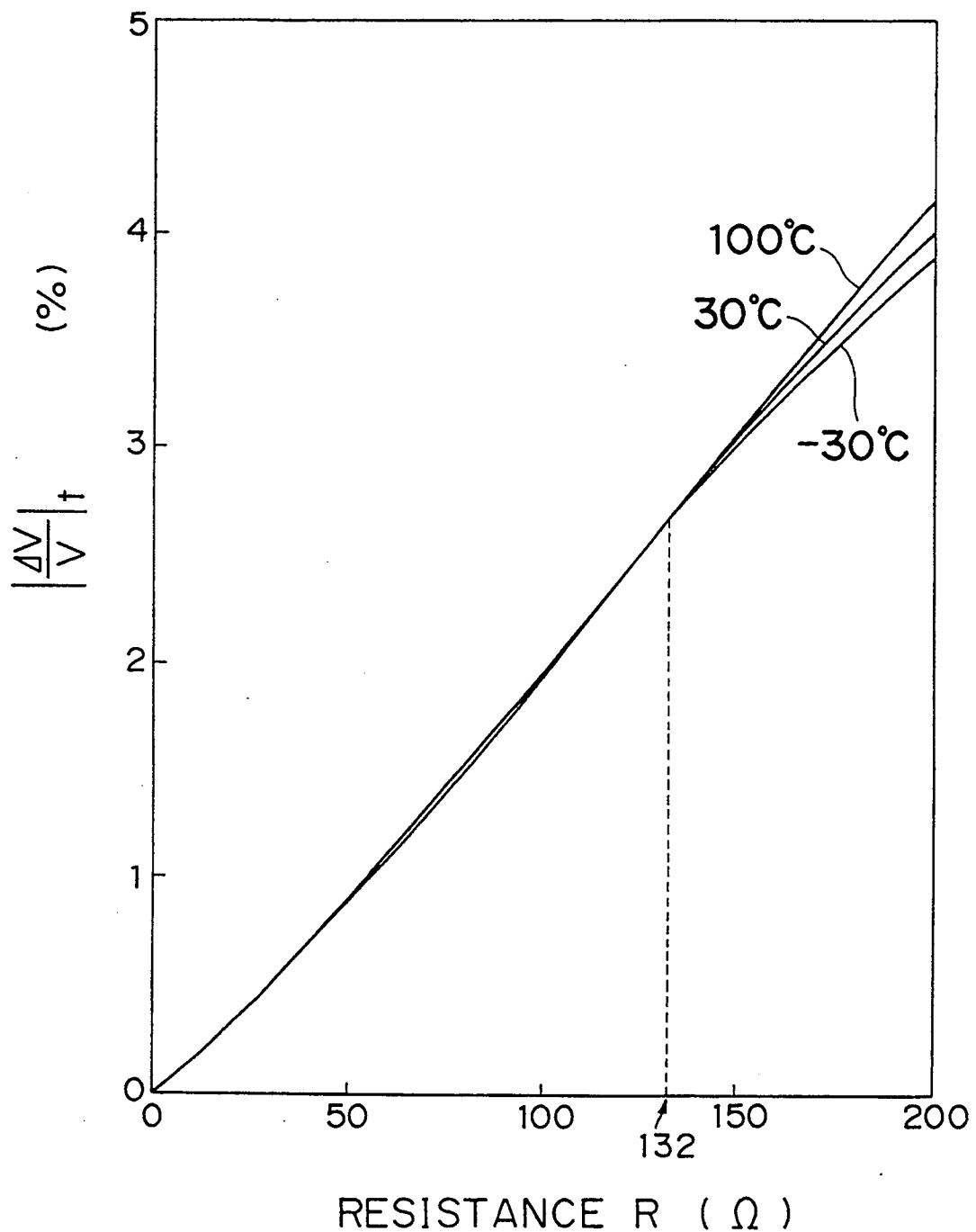
FIG. 4 is a graph of $|\Delta V/V|$ at three temperatures plotted against R in the bridge circuit.

As mentioned above, the value of R is determined in a range less than the impedance (342Ω) of the pressure detector coil 8. Because it is very difficult to solve Eq. (2) numerically, a change of $|66 V/V|0$ in Eq. (2) against R is obtained by using $L_i$, Ld, $r_i$, $r_d$ that are measured at a plurality of temperatures (−30°, 30° and 100 ° C. in this example) and the obtained data are plotted in a graph. FIG. 4 shows an example of the graph wherein the ordinate is $|\Delta V/V|$ and the abscissa is R. The solution of Eq. (2) is an intersection of the three curves at the different temperatures, or R is determined as 132Ω in case of FIG. 4. By determining R as mentioned above, the sensor output sensitivity, represented as a difference of the sensor outputs under zero pressure and under the highest pressure, can be equalized between the highest temperature and the lowest temperature. Thus, a change of output width of the pressure sensor against temperature can be decreased.

(c) Further, $R_d$ is determined by substituting the measured values explained in (a) and the value of R explained in (b) in Eq. (3) or (4).

Eq. (3) is used for the detection circuit shown in FIG. 2 wherein a difference between the terminal voltages $V_{ci}$ and $V_{cd}$ of the pressure detector coil 8 and of the dummy coil 9 is first obtained and the difference is amplified next. In this case, the sensor output represented as a difference of the outputs of the two coils 8, 9 under zero pressure (zero point output) becomes constant between the highest and lowest temperatures.

Eq. (4) is used for the detection circuit shown in FIG. 3 wherein the terminal voltages $V_{ci}$ and $V_{cd}$ of the pressure detector coil 8 and of the dummy coil 9 are first amplified and a difference of the two amplified values is obtained next. In this case, the sensor output under zero pressure is represented as a difference of the output of the pressure detector coil 8 with that of the dummy coil 9 with a corrected gain and the difference becomes zero at the highest temperature. Thus, the zero point drift due to temperature change can be decreased.

Figure 5:
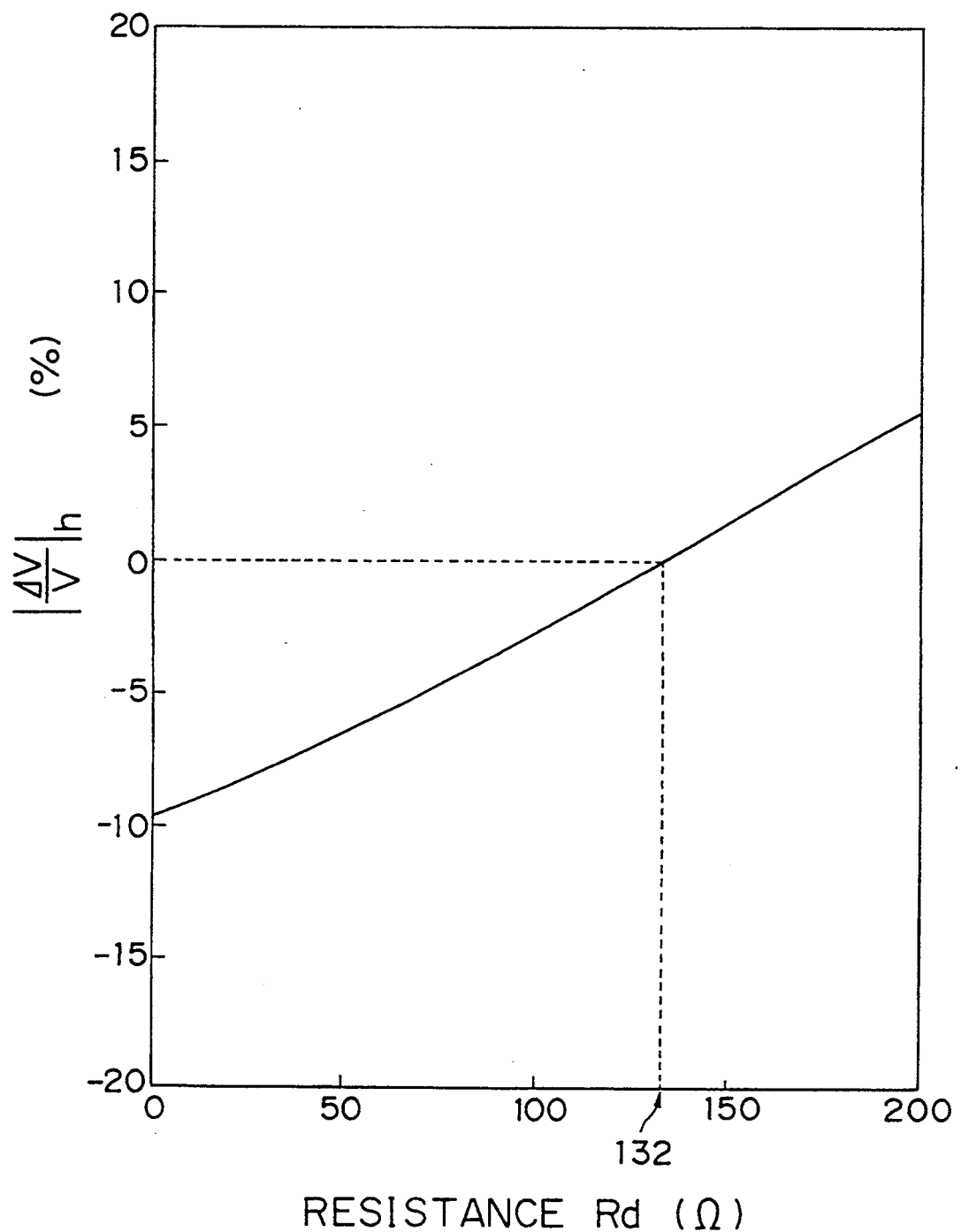
FIG. 5 is a graph of the zero point output change due to resistance $R_d$ in the bridge circuit.

In an example, the circuit shown in FIG. 3 is used and the optimum $R_d$ is determined according to Eq. (4). Because it is very difficult to solve Eq. (4) numerically, a change of $|\Delta V/V|_h$ in Eq. (4) against $R_d$ is obtained by using $L_i$, $L_d$, $r_i$, $r_d$ that are measured at the highest temperature (100° C. in this example) and the obtained data are plotted in a graph. FIG. 5 shows an example of the obtained data wherein determined as $|\Delta V/V|_h$ and the abscissa is $R_d$. The solution of Eq. (4) is the value of $R_d$ at which $|66 V/V|_h=0$, or $R_d$ is determined as $132\Omega$ in this example.

Figure 6:
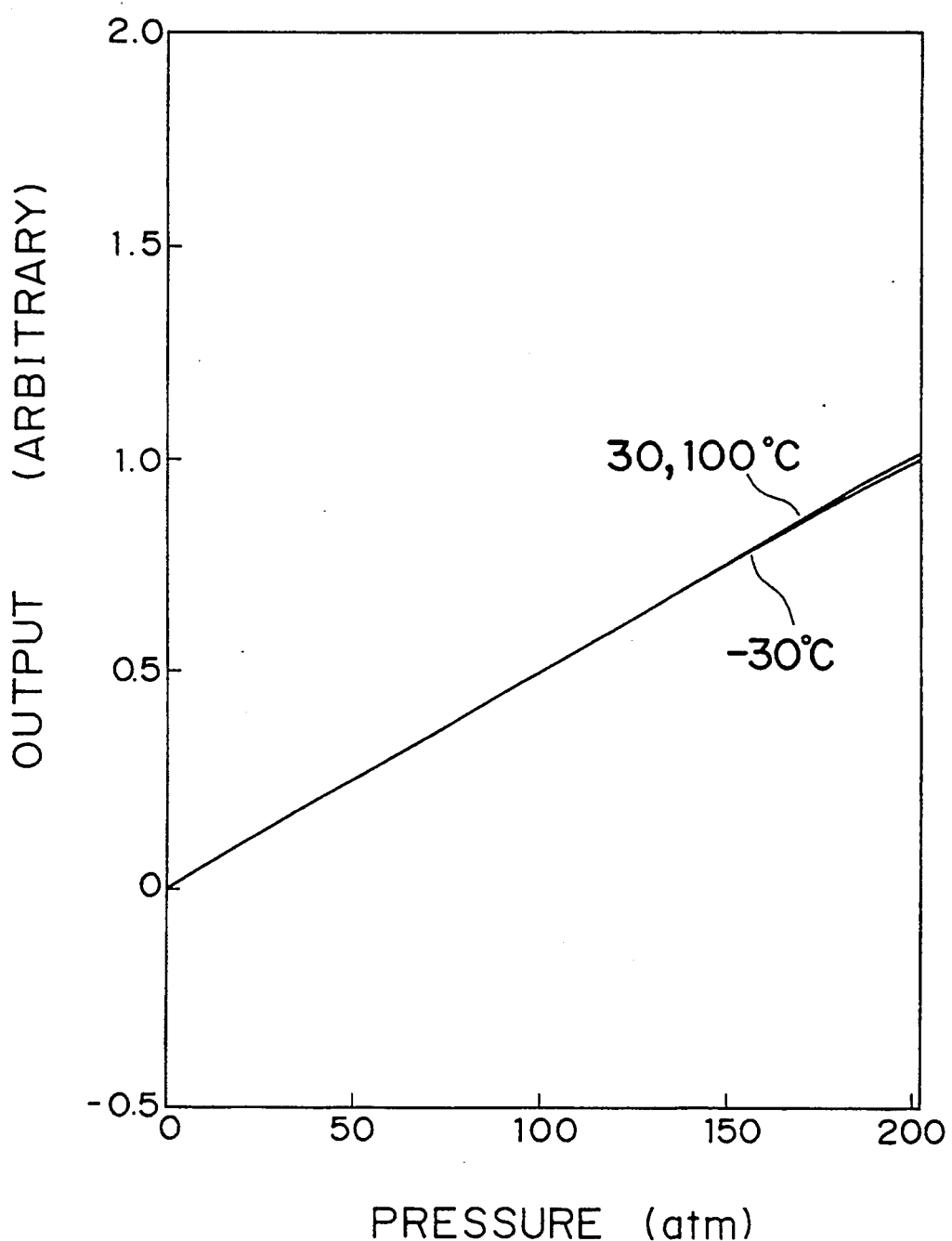
FIG. 6 is a graph of the output characteristic of another pressure sensor of the present invention.
Figure 7:
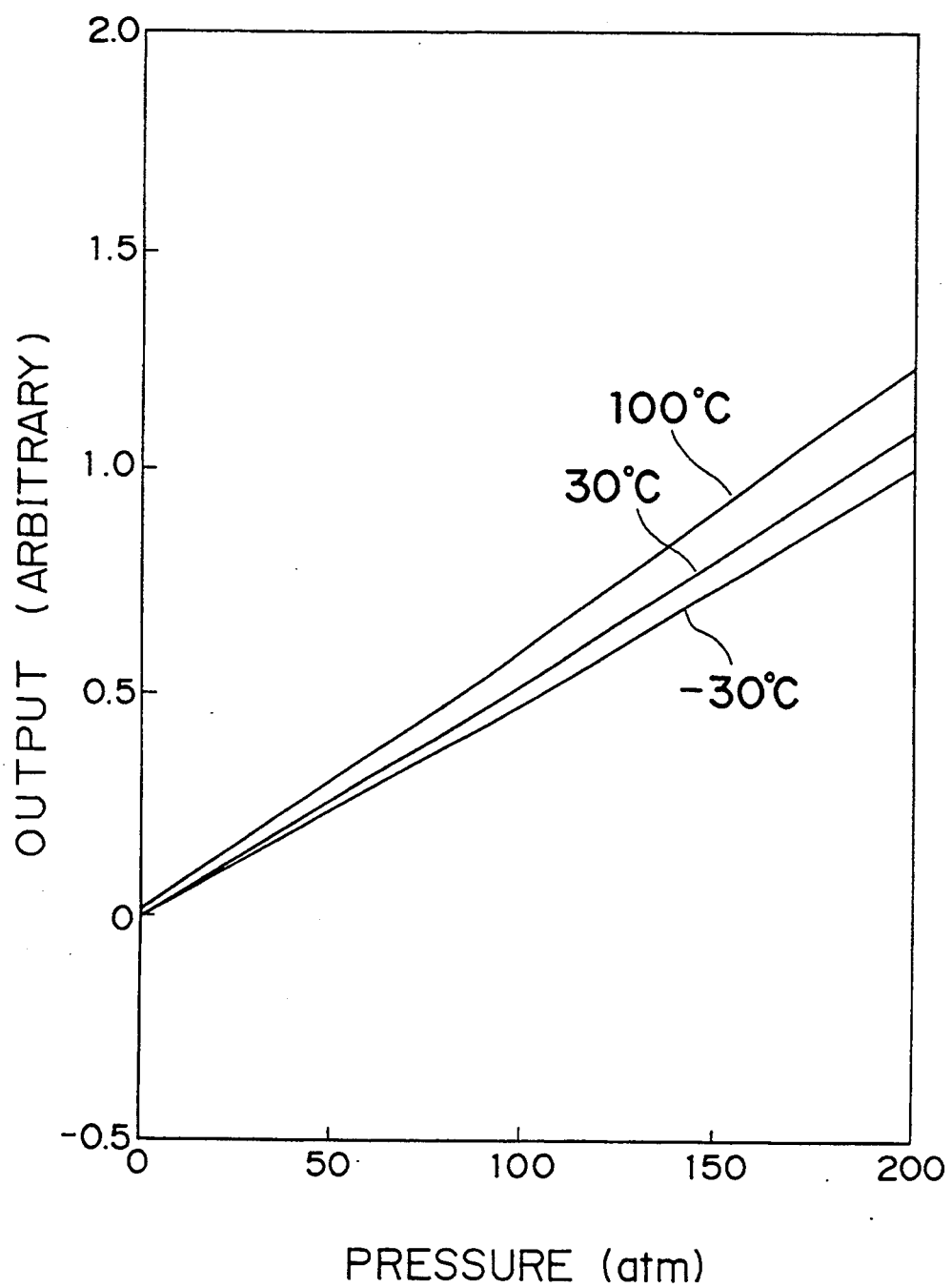
FIG. 7 is a graph of the output characteristic of the pressure sensor with a previous bridge circuit as a comparison example.

FIG. 6 shows a result of the output characteristic of a pressure sensor constructed by using the R, $R_d$ determined as explained above. The precision is about 1% of full scale. FIG. 7 shows a comparison data wherein R and $R_d$ are determined to be equal to the impedances of the coils 8, 9. It is apparent that the precision of pressure measurement is improved remarkably in FIG. 6 as compared with FIG. 7.

If the circuit shown in FIG. 2 is used, a similar very precise output is obtained by using $R_d$ obtained with Eq. (3).

As explained above, the precision of pressure sensor can be improved largely. Further, though this invention is explained on a pressure sensor as an example, a sensor for another mechanical property having a similar bridge structure can also have better temperature characteristics according to the present invention.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A pressure sensor comprising:
   a sensor body comprising a deforming part deformable under an applied pressure to be detected and a non-deforming part subjected to a constant pressure, the deforming part having an opening for introducing the applied pressure;
   a magnetic layer made of a material having large magnetostriction, which magnetic layer being fixed on the deforming part and on the non-deforming part;
   first and second permeability detector elements disposed to detect the permeability of the magnetic layer on the deforming part and on the non-deforming part, respectively, each of the first and second permeability detector elements having an inductance and an internal resistance, the first and second permeability detector elements being connected in series;
   a first resistor connected to the first permeability detector element, the resistance of the first resistor being smaller than the impedance of the first permeability detector element; and
   a second resistor connected to the second permeability detector element and to the first resistance, the resistance of the second resistor being smaller than the impedance of the second permeability detector element;
   wherein a bridge is constructed by the first and second permeability detector elements and the first and second resistors for taking out a difference of the voltages generated in the first and second permeability detector elements.

2. The pressure sensor according to claim 1, further comprising an AC voltage supplier for supplying an AC voltage to between a connection points of the first and second resistors and another connection points of the first and second permeability detector elements.

3. The pressure sensor according to claim 1, wherein said magnetic layer is made of an amorphous alloy having magnetostriction effect.

4. The pressure sensor according to claim 1, wherein the value of said first resistance satisfies the following relation:

$$\left|\frac{\Delta V}{V}\right|_h = \left|\frac{\Delta V}{V}\right|_l,$$

wherein $$\left|\frac{\Delta V}{V}\right|_h = \left|\left|\frac{V_{ca}}{V}\right| - \left|\frac{V_{ci}}{V}\right|\right|_h$$

$$= \left|\frac{\sqrt{[r_a(R+r_a)+W^2L_a^2]^2 + W^2L_a^2R^2}}{(R+r_a)^2 + W^2L_a^2} - \frac{\sqrt{[r_i(R+r_i)+W^2L_i^2]^2 + W^2L_i^2R^2}}{(R+r_i)^2 + W^2L_i^2}\right|_h,$$

and $$\left|\frac{\Delta V}{V}\right|_l = \left|\left|\frac{V_{ca}}{V}\right| - \left|\frac{V_{ci}}{V}\right|\right|_l$$

$$= \left|\frac{\sqrt{[r_a(R+r_a)+W^2L_a^2]^2 + W^2L_a^2R^2}}{(R+r_a)^2 + W^2L_a^2} - \frac{\sqrt{[r_i(R+r_i)+W^2L_i^2]^2 + W^2L_i^2R^2}}{(R+r_i)^2 + W^2L_i^2}\right|_l,$$

wherein
"V" denotes an AC voltage applied to the bridge,
"f" denotes the frequency of the applied voltage ($\omega=2\pi f$);
"$V_c$" denotes a terminal voltage of the coil,
"r" denotes an internal resistance of the coil,
"L" denotes an inductance of the coil, and
"R" denotes the resistance connected to the coil for the deforming part,
further, subscript "h" denotes a value at a first temperature,
subscript "l" denotes a value at a second temperature,
subscript "a" denotes a value under a first applied pressure different from zero, and
subscript "i" denotes a value under zero applied pressure.

5. The pressure sensor according to claim 4, wherein said first temperature is the highest operating temperature of the pressure sensor and said second temperature is the lowest operating temperature.

6. The pressure sensor according to claim 4, wherein said first pressure is the highest operating pressure of the pressure sensor.

7. The pressure sensor according to claim 1, wherein the value of said second resistance satisfies the following relation:

$$\left|\frac{\Delta V}{V}\right|_h = \left|\frac{\Delta V}{V}\right|_l;$$

wherein $$\left|\frac{\Delta V}{V}\right|_h = \left|\left|\frac{V_{ci}}{V}\right| - \left|\frac{V_{cd}}{V}\right|\right|_h$$

$$= \left|\frac{\sqrt{[r_i(R + r_i) + W^2 L_i^2]^2 + W^2 L_i^2 R^2}}{(R + r_i)^2 + W^2 L_i^2} - \frac{\sqrt{[r_d(R_d + r_d) + W^2 L_d^2]^2 + W^2 L_d^2 R_d^2}}{(R_d + r_d)^2 + W^2 L_d^2}\right|_h,$$

and $$\left|\frac{\Delta V}{V}\right|_l = \left|\left|\frac{V_{ci}}{V}\right| - \left|\frac{V_{cd}}{V}\right|\right|_l$$

$$= \left|\frac{\sqrt{[r_i(R + r_i) + W^2 L_i^2]^2 + W^2 L_i^2 R^2}}{(R + r_i)^2 + W^2 L_i^2} - \frac{\sqrt{[r_d(R_d + r_d) + W^2 L_d^2]^2 + W^2 L_d^2 R_d^2}}{(R_d + r_d)^2 + W^2 L_d^2}\right|_l,$$

wherein
"V" denotes an AC voltage applied to the bridge,
"f" denotes the frequency of the applied voltage ($\omega = 2\pi f$);
"$V_c$" denotes a terminal voltage of the first and second permeability detector elements,
"r" denotes an internal resistance of the first and second permeability detector elements,
"L" denotes an inductance of the first and second permeability detector elements,
"R" denotes the resistance connected to the first permeability detector element, and
"$R_d$" denotes the resistance connected to the second permeability detector element,
further, subscript "h" denotes a value at a first temperature,
subscript "l" denotes a value at a second temperature different from the first temperature,
subscript "a" denotes a value under the highest stress,
subscript "i" denotes a value under zero pressure, and
subscript "d" denotes a value for the non-deforming part.

8. The pressure sensor according to claim 7, further comprising a differential circuit for obtaining a difference of the output voltage of said bridge and an amplifier for amplifying the differential voltage obtained by the differential circuit.

9. The pressure sensor according to claim 7, wherein said first temperature is the highest operating temperature of the pressure sensor and said second temperature is the lowest operating temperature.

10. The pressure sensor according to claim 7, wherein said first pressure is the highest operating pressure of the pressure sensor.

11. The pressure sensor according to claim 1, wherein the value of said second resistance satisfies the following relation:

$$\left|\frac{\Delta V}{V}\right|_h = 0,$$

wherein $$\left|\frac{\Delta V}{V}\right|_h = \left|\left|\frac{V_{ci}}{V}\right|_h - \left|\frac{V_{cd}}{V}\right|_h \times \left|\frac{V_{ci}}{V_{cd}}\right|_l\right|$$

$$= \left|\left(\frac{\sqrt{[r_i(R + r_i) + W^2 L_i^2]^2 + W^2 L_i^2 R^2}}{(R + r_i)^2 + W^2 L_{ih}^2}\right)_h - \left(\frac{\sqrt{([r_d(R_d + r_d) + W^2 L_d^2]^2 + W^2 L_d^2 R_d^2}}{(R_d + r_d)^2 + W^2 L_d^2}\right)_h \times \left\{\frac{\frac{\sqrt{[r_i(R + r_i) + W^2 L_i^2]^2 + W^2 L_i^2 R^2}}{(R + r_i)^2 + W^2 L_i^2}}{\frac{\sqrt{[r_d(R_d + r_d) + W^2 L_d^2]^2 + W^2 L_d^2 R_d^2}}{(R_d + r_d)^2 + W^2 L_d^2}}\right\}_l\right|.$$

wherein
"V" denotes an AC voltage applied to the bridge,
"f" denotes the frequency of the applied voltage ($\omega = 2\pi f$);
"$V_c$" denotes a terminal voltage of the first and second permeability detector elements,
"r" denotes an internal resistance of the first and second permeability detector elements,
"L" denotes an inductance of the first and second permeability detector elements,
"R" denotes the resistance connected to the first permeability detector element, and
"$R_d$" denotes the resistance connected to the second permeability detector element,
further, subscript "h" denotes a value at a first temperature,
subscript "l" denotes a value at a second temperature different from the first temperature,
subscript "a" denotes a value under the highest stress,
subscript "i" denotes a value under zero pressure, and
subscript "d" denotes a value for the non-deforming part.

12. The pressure sensor according to claim 11, further comprising first and second amplifiers for amplifying the output voltages of the first and second permeability detector elements and a differential circuit for obtaining a difference of the output voltage of the first and second amplifiers.

13. The pressure sensor according to claim 11, wherein said first temperature is the highest operating temperature of the pressure sensor and said second temperature is the lowest operating temperature.

14. The pressure sensor according to claim 11, wherein said first pressure is the highest operating pressure of the pressure sensor.

15. The pressure sensor according to claim 4, wherein the value of said second resistance satisfies the following relation:

$$\left|\frac{\Delta V}{V}\right|_h = \left|\frac{\Delta V}{V}\right|_l,$$

wherein $$\left|\frac{\Delta V}{V}\right|_h = \left|\left|\frac{V_{ci}}{V}\right| - \left|\frac{V_{cd}}{V}\right|\right|_h$$

$$= \left|\frac{\sqrt{[r_i(R + r_i) + W^2 L_i^2]^2 + W^2 L_i^2 R^2}}{(R + r_i)^2 + W^2 L_i^2} - \frac{\sqrt{[r_d(R_d + r_d) + W^2 L_d^2]^2 + W^2 L_d^2 R_d^2}}{(R_d + r_d)^2 + W^2 L_d^2}\right|_h,$$

and $$\left|\frac{\Delta V}{V}\right|_l = \left|\left|\frac{V_{ci}}{V}\right| - \left|\frac{V_{cd}}{V}\right|\right|_l$$

$$= \left|\frac{\sqrt{[r_i(R + r_i) + W^2 L_i^2]^2 + W^2 L_i^2 R^2}}{(R + r_i)^2 + W^2 L_i^2} - \frac{\sqrt{[r_d(R_d + r_d) + W^2 L_d^2]^2 + W^2 L_d^2 R_d^2}}{(R_d + r_d)^2 + W^2 L_d^2}\right|_l,$$

wherein

"V" denotes an AC voltage applied to the bridge,
"f" denotes the frequency of the applied voltage ($\omega = 2\pi f$);
"$V_c$" denotes a terminal voltage of the first and second permeability detector elements,
"r" denotes an internal resistance of the first and second permeability detector elements,
"L" denotes an inductance of the first and second permeability detector elements,
"R" denotes the resistance connected to the first permeability detector element, and
"$R_d$" denotes the resistance connected to the second permeability detector element,
further, subscript "h" denotes a value at a first temperature,
subscript "l" denotes a value at a second temperature different from the first temperature,
subscript "a" denotes a value under the highest stress,
subscript "i" denotes a value under zero pressure, and
subscript "d" denotes a value for the non-deforming part.

16. The pressure sensor according to claim 15, further comprising a differential circuit for obtaining a difference of the output voltage of said bridge and an amplifier for amplifying the differential voltage obtained by the differential circuit.

17. The pressure sensor according to claim 15, wherein said first temperature is the highest operating temperature of the pressure sensor and said second temperature is the lowest operating temperature.

18. The pressure sensor according to claim 15, wherein said first pressure is in the highest operating pressure of the pressure sensor.

19. The pressure sensor according to claim 4, wherein the value of said second resistance satisfied the following relation:

$$\left|\frac{\Delta V}{V}\right|_h = 0,$$

wherein $$\left|\frac{\Delta V}{V}\right|_h = \left|\left|\frac{V_{ci}}{V}\right|_h - \left|\frac{V_{cd}}{V}\right|_h \times \left|\frac{V_{ci}}{V_{cd}}\right|_l\right|$$

$$= \left|\left(\frac{\sqrt{[r_i(R + r_i) + W^2 L_i^2]^2 + W^2 L_i^2 R^2}}{(R + r_i)^2 + W^2 L_{ih}^2}\right)_h - \right.$$

$$\left(\frac{\sqrt{[r_d(R_d + r_d) + W^2 L_d^2]^2 + W^2 L_d^2 R_d^2}}{(R_d + r_d)^2 + W^2 L_d^2}\right)_h \times$$

$$\left.\left\{\frac{\frac{\sqrt{[r_i(R + r_i) + W^2 L_i^2]^2 + W^2 L_i^2 R^2}}{(R + r_i)^2 + W^2 L_i^2}}{\frac{\sqrt{[r_d(R_d + r_d) + W^2 L_d^2]^2 + W^2 L_d^2 R_d^2}}{(R_d + r_d)^2 + W^2 L_d^2}}\right\}_l\right|$$

wherein
"V" denotes an AC voltage applied to the bridge,
"f" denotes the frequency of the applied voltage ($\omega = 2\pi f$);
"$V_c$" denotes a terminal voltage of the first and second permeability detector elements,
"r" denotes an internal resistance of the first and second permeability detector elements,
"L" denotes an inductance of the first and second permeability detector elements,
"R" denotes the resistance connected to the first permeability detector element, and
"$R_d$" denotes the resistance connected to the second permeability detector element,
further, subscript "h" denotes a value at a first temperature,
subscript "l" denotes a value at a second temperature different from the first temperature,
subscript "a" denotes a value under the highest stress,
subscript "i" denotes a value under zero pressure, and
subscript "d" denotes a value for the non-deforming part.

20. The pressure sensor according to claim 19, further comprising first and second amplifiers for amplifying the output voltages of the first and second permeability detector elements and a differential circuit for obtaining a difference of the output voltage of the first and second amplifiers.

21. The pressure sensor according to claim 19, wherein said first temperature is the highest operating temperature of the pressure sensor and said second temperature is the lowest operating temperature.

22. The pressure sensor according to claim 19, wherein said first pressure is the highest operating pressure of the pressure sensor.

* * * * *